United States Patent [19]
Haage

[11] Patent Number: 5,143,497
[45] Date of Patent: Sep. 1, 1992

[54] EXPANSIBLE PLUG FOR FIXING TO A SOLID OR HOLLOW BUILDING MATERIAL

[75] Inventor: Manfred Haage, Dornstetten-Aach, Fed. Rep. of Germany

[73] Assignee: Fischerwerke Artur Fischer GmbH & Co. KG., Waldachtal, Fed. Rep. of Germany

[21] Appl. No.: 749,701

[22] Filed: Aug. 26, 1991

[30] Foreign Application Priority Data

Aug. 25, 1990 [DE] Fed. Rep. of Germany ....... 4026944

[51] Int. Cl.$^5$ ........................ F16B 13/04; F16B 13/06
[52] U.S. Cl. ....................................... 411/33; 411/21; 411/55
[58] Field of Search ........................ 411/21, 22, 44, 55, 411/57, 32, 33

[56] References Cited

U.S. PATENT DOCUMENTS

| | | | |
|---|---|---|---|
| 2,147,357 | 2/1939 | Scholtes | 411/33 |
| 3,535,750 | 10/1970 | Metz | 411/21 |

FOREIGN PATENT DOCUMENTS

| | | | |
|---|---|---|---|
| 3241158 | 5/1984 | Fed. Rep. of Germany | 411/32 |
| 1232223 | 5/1971 | United Kingdom | 411/21 |

*Primary Examiner*—Neill R. Wilson
*Attorney, Agent, or Firm*—Michael J. Striker

[57] ABSTRACT

The expansible plug for fixing an element or frame member on solid or hollow building material, has a plug shank (1) having a plurality of expansion discs (3,4) arranged one after the other along the plug shank (1). The expansion discs (3,4) are provided with eccentric bores (12,13) located so that, without the fixing screw (23) inserted, the bores (12,13) of adjacent discs (3,4) are noncoaxial or staggered with respect to one another and overlap one another and so that the overlapping bores (12,13) form a constricted screw hole (15) through the plug shank (1). When a fixing screw (23) is screwed into the expansible plug the expansion discs (3,4) are displaced laterally so that the bores (12,13) in the expansion disks have a coaxial relationship and the expansion disks (3,4) are displaced laterally outwards from the plug shank to secure the expansible plug in a hole in which it is located. The expansion discs (3,4) are preferably attached to joining members (9,10) on opposite sides of the plug shank and every second successive expansion disc (3,4) is attached to a common resilient joining member (9,10).

6 Claims, 5 Drawing Sheets

EXPANSIBLE PLUG FOR FIXING TO A SOLID OR HOLLOW BUILDING MATERIAL

BACKGROUND OF THE INVENTION

The invention relates to an expansible plug, particularly to an expansible plug used for anchoring to solid or hollow building materials.

A known expansion plug has expansion elements formed on a shank of the plug and is provided with a screw hole for receiving a fixing screw that displaces the expansion elements laterally as it is screwed into the screw hole.

Expansible plugs made of plastic material are also known, which have essentially two expansible arms that are pressed laterally outwards as a fixing screw is screwed into them thereby forcing them to expand laterally. When an expansible plug of this kind is inserted in a hole in masonry, then the arms of the expansible plug, which may also be referred to as expansion elements, are pressed against the wall of the drilled hole, thus securing the expansion plug firmly in the drilled hole. These expansible plugs achieve very good holding values in hard solid building materials. However in softer building materials and in honeycomb bricks, the use of these known expansible plugs is only possible to a limited extent.

Universally usable expansible plugs are also known which have a sleeve-shaped end opposite the plug head which protrudes from the hole in which they are inserted. The fixing screw is inserted into the sleeve-shaped end. In solid building material, this universal plug acts like the above-described expansible plug, and presses with its arms against the wall of the drilled hole. In a hollow building material, on the other hand, the sleeve-shaped end is moved towards the plug head by turning the fixing screw, the arms opening wide apart in the cavity and engaging the rear side of a member defining the cavity. In building materials with dispersed cavities or cavities with bordering cross members the structure of the material may prevent the arms from opening out, so that the expansible plug in this situation braces against the wall of the drilled hole.

SUMMARY OF THE INVENTION

It is an object of the present invention to provide an improved expansible plug for fixing or anchoring to a building material, with which high holding values can be achieved for both solid and hollow building materials with and without cavities present.

According to the present invention, the expansible plug of the above described kind is provided with a plurality of laterally displaceable expansion disks having eccentric bores and being arranged in succession, one after the other, so that the bores of adjacent discs are noncoaxial or staggered with respect to one another and overlap one another, so that the overlapping portions of the eccentric bores form a constricted screw hole or throughgoing bore in which a fixing screw can be received.

The expansion discs acting as expansion elements are distributed largely over the entire length of the expansible plug, so that a very uniform expansion is obtained over the entire expansion region. As a fixing screw is screwed in, the eccentrically arranged bores of the expansion discs are forced into a coaxial alignment, namely concentric with the center line of the fixing screw. The expansion discs are thus displaced depending on the position of the eccentric bore. Since the bores of adjacent discs are staggered with respect to one another, the adjacent discs are also displaced outwards in a staggered configuration as the fixing screw is screwed in the expansible plug. Thus, in an alternating manner, one expansion disc is displaced to the other side. When the expansible plug is inserted into a hole in a solid building material and the fixing screw is screwed in, then the expansion discs are pressed in each case against the wall of the drilled hole on opposite sides. When used in a hollow building material, the expansion discs engage the cavities so that a positive engagement in the material is achieved in the region of each wall that defines a cavity.

The expansion discs are preferably joined to one another by joining members, every second successive expansion disc being mounted on a common joining member. The expansion discs projecting inwardly preferably from two separate joining members extending externally on the plug are staggered on each joining member with respect to the expansion discs of the other joining member. The joining member can be made of a resilient or elastic material.

On its shank end remote from the plug head, the expansible plug preferably has a pressure collar, into which the fixing screw engages so that an axial clamping of the expansion region which includes a number of the expansion discs is possible.

It is particularly advantageous to construct the expansible plug with its associated fixing screw so that the pitch of the fixing screw is an integral multiple of the thickness of the expansion discs The individual expansion discs are thus able to wedge themselves between the flanks of the screw thread and provide mutual support for each other. This means that the expansible plug of the invention mounted in masonry has a greater strength and thus a higher load-carrying capacity.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
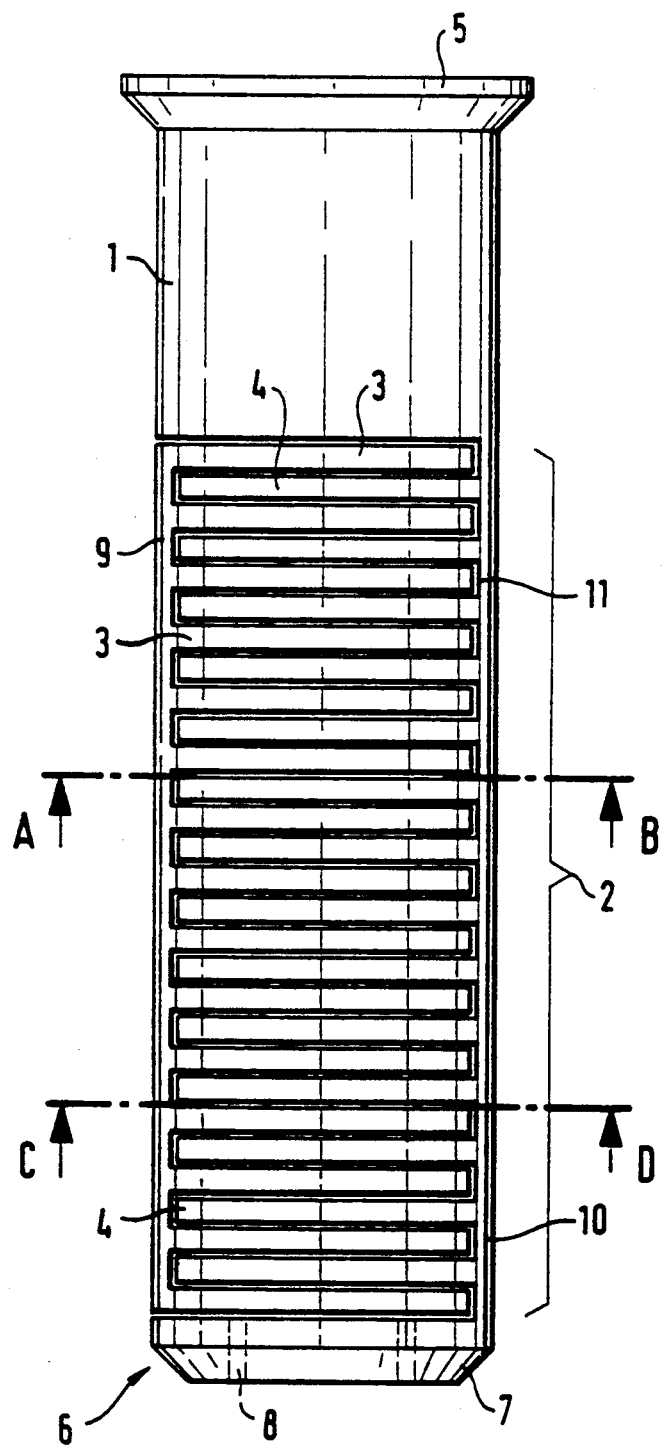
FIG. 1 is a side elevational view of an expansible plug having a plurality of expansion discs according to the invention.

The expansible plug illustrated in FIG. 1 is in the form of a so-called frame plug, which, when used for through-mounting applications, can be inserted through a bore or drilled hole of a frame part to fixed into a hole drilled in masonry. The expansible plug has a plug shank 1 with an expansion region 2, which is formed by a plurality of successive expansion discs 3,4. In its upper region, the plug shank 1 is in the form of a plain plug sleeve, at the upper end of which there is a plug head 5 widened in the shape of a funnel. The plug head 5 is suitable for receiving the screw head of a countersunk fixing screw 23.

At the lower end 6 of the shank, the expansible plug has a pressure collar 7 with an axial bore 8, which is in the form of a threaded bore.

The expansion discs 3,4 are arranged alternatively on a left-hand joining member 9 on one side of the plug and a right-hand joining member 10 on the other opposite side of the plug.

Figure 2A:
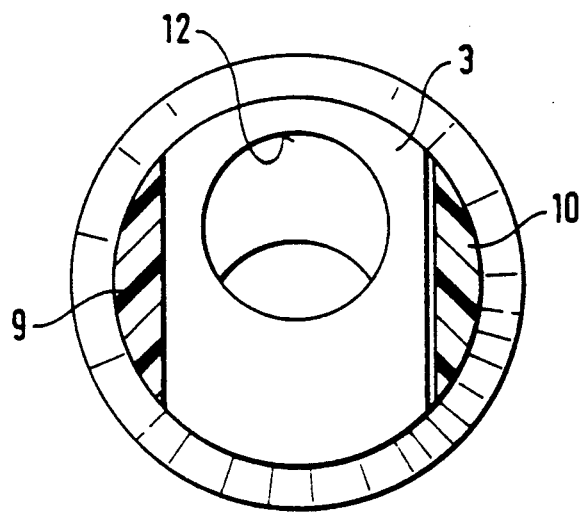
FIG. 2a is a sectional view through the expansible plug of FIG. 1 taken along the section line AB as seen in the direction of the arrows.
Figure 2B:
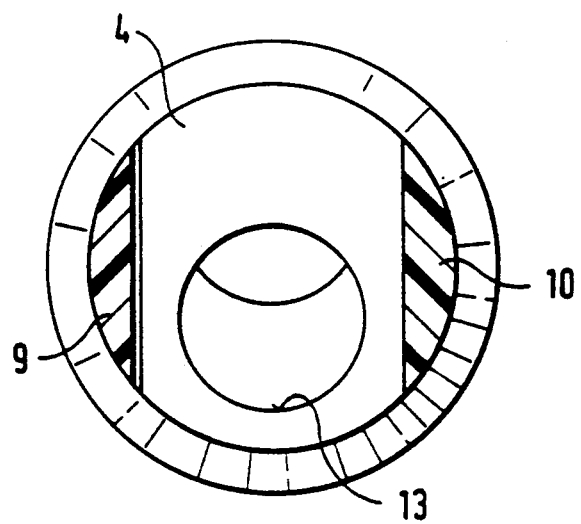
FIG. 2b is a sectional view through the expansible plug of FIG. 1 taken along the section line CD as seen in the direction of the arrows.

FIGS. 2a and 2b illustrate the two sections AB and CD of the plug shank 1 of FIG. 1. The section AB shows the expansion discs 3 with an eccentric bore 12 projecting from the joining member 9 towards the right.

The section CD shows the expansion disc 4 with an eccentric bore 13 projecting from the joining member 10 towards the left.

The two expansion discs 3,4 are arranged one on top of the other, or one after the other, so that they are laterally displaceable in the case of the expansible plug illustrated in FIG. 1, the eccentric bores 12, 13 being oppositely arranged.

Figure 3:
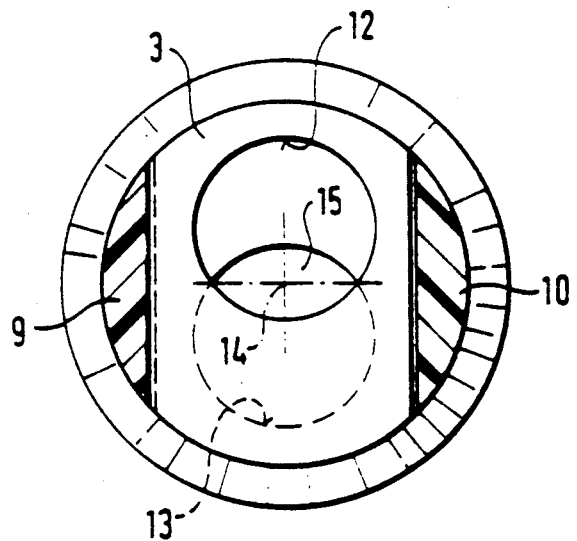
FIG. 3 is a sectional view through the expansible plug before installation.
Figure 4:
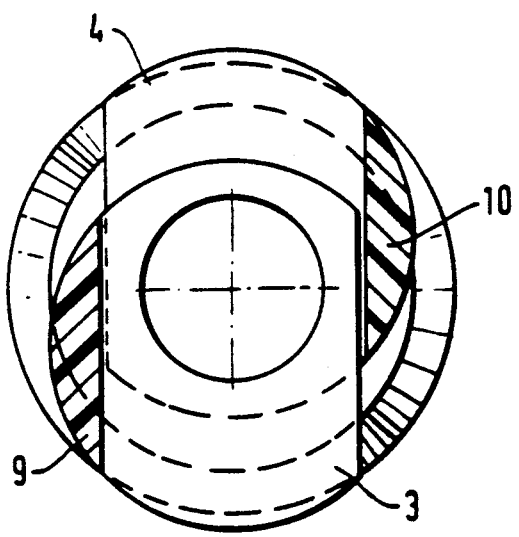
FIG. 4 is a sectional view through the expansible plug after installation.

In FIG. 3, the position of the bores 12,13 inside the expansion region 2 can be seen. The eccentric bores 12,13 overlap in the region of the center point 14 of the axis, so that in this region a constricted screw hole or throughgoing bore 15 is formed. The expression "a constricted screw throughgoing bore" can be used here, because the screw thread diameter of the fixing screw to be inserted into the plug corresponds approximately to the diameter of the bores 12,13 (i.e. the diameter of the bores 12,13 is chosen so that that is true). If the fixing screw 23 is now screwed into the expansible plug shown in FIG. 1, then the eccentric bores 12,13 are moved from their eccentric position shown in FIG. 3 into a coaxial position as illustrated in FIG. 4. The expansion discs 3,4 are thus constrained to move downwards and upwards into the position illustrated in FIG. 4.

Figure 5:
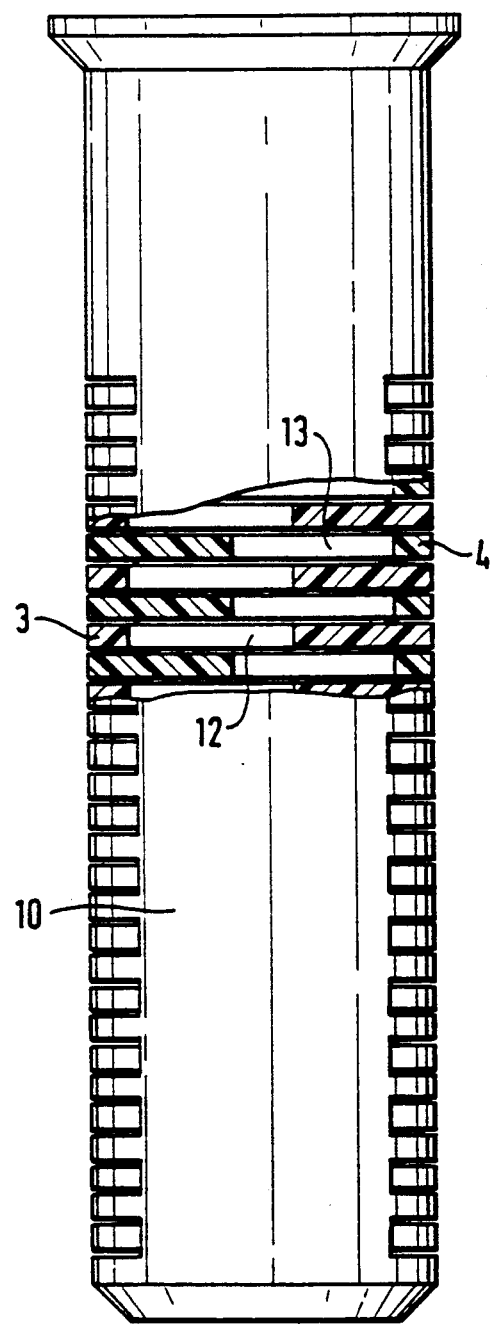
FIG. 5 is an additional side view of the expansible plug of FIG. 1.

FIG. 5 shows the expansible plug of FIG. 1 partly in section, the eccentric bores 12, 13 of the discs 3,4 being staggered laterally with respect to one another.

Figure 6:
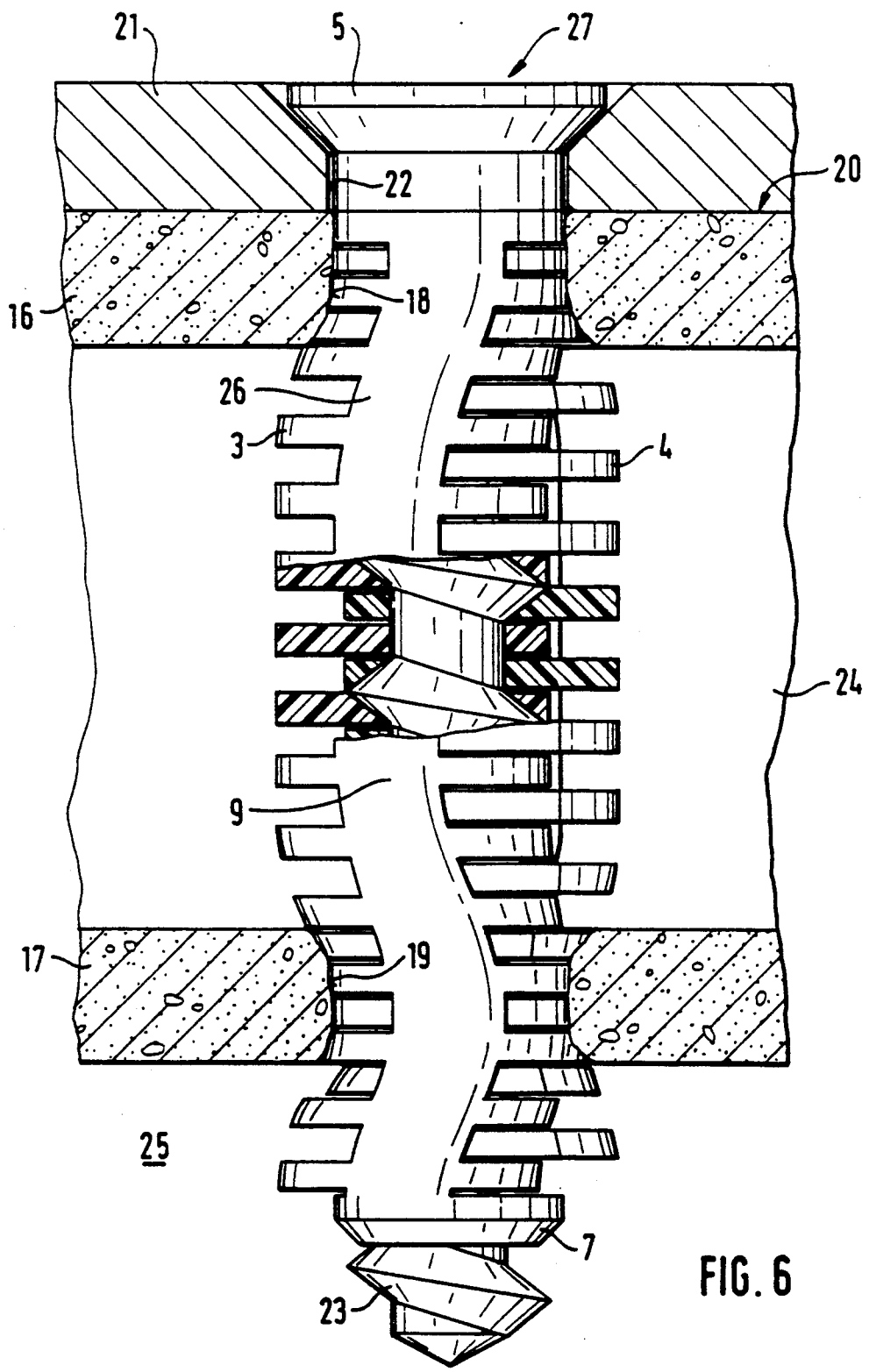
FIG. 6 is another side elevational view of the expansible plug of FIG. 1 shown in installed in a hollow building material.

FIG. 6 illustrates the expansible plug of FIG. 5 mounted in a hollow building material. The hollow building material here comprises a honeycomb brick with walls 16, 17, in which there is provided respective coaxial holes 18,19. In the wall surface 20 there is a frame part 21 provide with a throughgoing hole 22, into which the expansible plug is inserted initially without the fixing screw. After screwing in a fixing screw 23, the expansion discs 3,4 have been displaced in opposite directions into the position illustrated, so that the expansible plug is located positively in the masonry in the region of the walls 16,17. In the region of the coaxial holes 18,19, the expansion discs 3,4 press against the wall of the drilled hole. At the transition region from the holes 18, 19 to the cavities 24,25, the joining member 9 has a bulge 26 resulting from the differing displacement of the expansion discs 3.

The fixing screw 23 is a customary countersunk screw, the countersunk head 27 of which is located in the funnel-shaped plug head 5. If the fixing screw 23 is tightened to an appropriate degree, then the pressure collar 7 is thereby drawn in the direction of the plug head 5, with the result that the expansion discs of the expansion region are clamped together. The plug mounted in he masonry thus has a considerable rigidity imparted to its, which guarantees an extremely reliable fixing.

The pitch of the fixing screw 23 is preferably such that this corresponds to an integral multiple of the thickness of the expansion discs 3,4. In the embodiment illustrated, the pitch corresponds to the thickness of two expansion discs 3,4.

It will be understood that each of the elements described above, or two or more together, may also find a useful application in other types of constructions differing from the types described above.

While the invention has been illustrated and described as embodied in an expansible plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an expansible plug for fixing on solid or hollow building material, comprising a plug shank having a plurality of expansion elements, said expansion elements having a screw bore extending therethrough so that said screw bore can receive a fixing screw that displaces the expansion elements laterally when said fixing screw is screwed into said screw bore, the improvement wherein the expansion elements comprise a plurality of laterally displaceable expansion discs (3,4) having eccentric bores (12,13) and being arranged one after the other, so that the bores (12,13) of adjacent discs (3,4) are staggered with respect to one another and overlap one another to form an overlapping region, so that the overlapping region of the eccentric bores (12,13) forms a constricted screw hole (15) acting as said screw bore, and comprising a plug head (5) at one end of the plug shank (1) and a pressure collar (7) at another end of the plug shank opposite to and remote from the plug head (5), said pressure collar (7) having an axial bore (8) and being connected to said expansion disks (3,4), said pressure collar (7) being a sleeve-shaped shank part joining the plug shank (1) at said other end.

2. The improvement as defined in claim 1, further comprising two resilient joining members (9,10) on opposite sides of said shank and wherein every second successive one of said expansion discs (3,4) is attached to a common one of said resilient joining members (9,10).

3. The improvement as defined in claim 2, wherein the two opposing joining members (9,10) extend along an outside portion of the plug shank (1) and the expansion discs (3,4) project inwards from the joining members and are staggered so that said expansion discs overlap each other.

4. The improvement as defined in claim 1, wherein the expansible plug comprises two plug halves engaging in one another by the expansion discs (3,4).

5. The improvement as defined in claim 1, wherein the plug shank and the expansion discs are made of a plastic material.

6. The improvement as defined in claim 1, wherein each of the expansion discs (3,4) has a thickness such that a pitch of the fixing screw (23) is an integral multiple of the thickness of the expansion discs (3,4).

* * * * *